UNITED STATES PATENT OFFICE.

EDWARD GOODRICH ACHESON, OF NEW YORK, N. Y.

DEFLOCCULATING SOLID MATERIALS AND AGENTS THEREFOR.

1,345,305. Specification of Letters Patent. Patented June 29, 1920.

No Drawing. Application filed January 22, 1920. Serial No. 353,342.

*To all whom it may concern:*

Be it known that I, EDWARD GOODRICH ACHESON, a citizen of the United States, residing at New York, in the county of New York and State of New York, have invented certain new and useful Improvements in Deflocculating Solid Materials and Agents Therefor, of which the following is a specification.

In my prior U. S. Patent No. 1,253,556, patented January 15, 1918, I have described and claimed a novel composition of matter useful for deflocculating solid bodies, and for other purposes, and a process of preparing the same, said composition comprising the product of reaction of ammonia upon the heat-conversion products of starchy materials. As disclosed in the said patent, a suitable starchy material, as wheat or other cereal grain, is first roasted at a temperature approximating but below that at which carbonization occurs. The roasted product is then preferably finely ground or pulverized, and is then treated with an ammoniacal solution, the addition of ammonia being continued, preferably with constant stirring, until such time as a distinct ammoniacal odor develops and persists in the product, which in the meantime assumes a pasty consistence. This pasty mass is then extracted with water, and the resulting solution, freed from the insoluble residue, constitutes the deflocculating agent described in the said patent.

The present invention relates to an improvement upon the above described process and product, said improvement consisting in adding to the ammonia, preferably before treating therewith the heat-conversion products of the starchy material, a suitable proportion of formaldehyde.

As is well known formaldehyde reacts strongly with ammonia, yielding a crystallizable basic compound known as hexamethylenetetramin, the reaction taking place in accordance with the following equation:

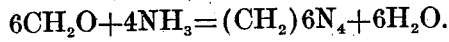

$$6CH_2O + 4NH_3 = (CH_2)_6N_4 + 6H_2O.$$

By adding formaldehyde in the equivalent proportion represented by the above equation the whole of the ammonia may of course be transformed into hexamethylenetetramin, the transformation being accompanied by the disappearance of the ammoniacal odor. In practice, however, it is not necessary to effect such complete conversion, and I prefer to add formaldehyde in substantially less proportion than is indicated by the above equation. Without limiting my invention to any particular proportion, I have found that a very satisfactory solution for deflocculating purposes can be prepared by commingling 10 parts by volume of 26% ammonia solution with 8 parts by volume of 27% formaldehyde solution. This operation may be carried out under a return condenser in order to avoid loss of reagents.

The resulting clear solution is caused to react with the heat-conversion products of starchy materials to form the deflocculating solution, the several operations, including the deflocculating operation, being carried out substantially in the manner described in my prior patent above mentioned.

Obviously the solution may be prepared in other ways, as for example by dissolving pre-formed hexamethylenetetramin in water, or preferably in an ammoniacal solution, the proportions chosen being preferably such as to yield a solution having the characteristics mentioned above.

I claim:—

1. As a new composition of matter, the product of reaction of hexamethylenetetramin upon the heat-conversion products of starchy materials.

2. As a new composition of matter, the product of reaction of hexamethylenetetramin in ammoniacal solution upon the heat-conversion products of starchy materials.

3. The process of preparing a composition of matter, comprising roasting starchy materials at a temperature approximating but below the point of carbonization, and extracting the soluble constituents from the resulting product by an aqueous solution containing hexamethylenetetramin.

4. Process of preparing a composition of matter, comprising roasting starchy materials at a temperature approximating but below the point of carbonization, and extracting the soluble constituents from the resulting product by an aqueous solution containing hexamethylenetetramin and ammonia.

5. Method of deflocculating amorphous bodies, comprising treating the same with the product of reaction of hexamethylenetetramin upon the heat-conversion products of starchy materials.

6. Method of deflocculating amorphous bodies, comprising treating the same with the product of reaction of hexamethylenetetramin in ammoniacal solution upon the heat-conversion products of starchy materials.

In testimony whereof I affix my signature.

EDWARD G. ACHESON.